(12) United States Patent
Katsura

(10) Patent No.: US 9,248,726 B2
(45) Date of Patent: Feb. 2, 2016

(54) SUNROOF APPARATUS FOR VEHICLE

(71) Applicant: AISIN SEIKI KABUSHIKI KAISHA, Kariya-shi, Aichi-ken (JP)

(72) Inventor: Shintaro Katsura, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/478,787

(22) Filed: Sep. 5, 2014

(65) Prior Publication Data
US 2015/0069793 A1 Mar. 12, 2015

(30) Foreign Application Priority Data

Sep. 6, 2013 (JP) .................................. 2013-185555

(51) Int. Cl.
*B60J 7/047* (2006.01)
*B60J 7/043* (2006.01)
*B60J 7/02* (2006.01)

(52) U.S. Cl.
CPC ................ *B60J 7/0435* (2013.01); *B60J 7/024* (2013.01)

(58) Field of Classification Search
CPC .......... B60J 7/0435; B60J 7/024; B60J 7/057; B60J 7/185
USPC ........................ 296/216.02–216.05, 223, 224
See application file for complete search history.

(56) References Cited

U.S. PATENT DOCUMENTS

| 2009/0021056 A1 | 1/2009 | Manders et al. |
| 2011/0227372 A1 | 9/2011 | Hirota et al. |
| 2013/0264845 A1 | 10/2013 | Katsura et al. |

FOREIGN PATENT DOCUMENTS

| DE | 37 15 268 | 1/1988 |
| EP | 2 017 108 | 1/2009 |
| EP | 2 366 571 | 9/2011 |
| JP | 2000-108676 A | 4/2000 |
| JP | 4109583 B | 4/2006 |

OTHER PUBLICATIONS

S. Katsura et al., "Vehicle Sunroof Apparatus," U.S. Appl. No. 14/475,818, filed Sep. 3, 2014.
S. Katsura et al., "Vehicle Sunroof Apparatus," U.S. Appl. No. 14/477,376, filed Sep. 4, 2014.
S. Katsura, "Sunroof Apparatus for Vehicle," U.S. Appl. No. 14/477,255, filed Sep. 4, 2014.
S. Katsura et al., "Sunroof Apparatus for Vehicle," U.S. Appl. No. 14/478,726, filed Sep. 5, 2014.
Extended European Search Report for EP 14183719 dated Nov. 12, 2015.

*Primary Examiner* — Dennis H Pedder
(74) *Attorney, Agent, or Firm* — Finnegan, Henderson, Farabow, Garrett & Dunner, LLP

(57) ABSTRACT

A sunroof apparatus for a vehicle includes a movable panel, a guide rail, a support bracket, a first sliding member, a second sliding member, a check mechanism restricting a movement of the movable panel in a front-rear direction of a vehicle to bring the movable panel to a tilt-up state and releasing the restriction of the movement of the movable panel while maintaining the tilt-up state, an engagement and disengagement switching mechanism including a first member and a second member supported by one and the other of the first sliding member and the second sliding member, a holding portion provided at the first sliding member, and a retention portion provided at the second sliding member and held to be non-movable in a vehicle width direction by the holding portion in a case where the first member and the second member are engaged with each other.

10 Claims, 7 Drawing Sheets

SUNROOF APPARATUS FOR VEHICLE

CROSS REFERENCE TO RELATED APPLICATIONS

This application is based on and claims priority under 35 U.S.C. §119 to Japanese Patent Application 2013-185555, filed on Sep. 6, 2013, the entire content of which is incorporated herein by reference.

TECHNICAL FIELD

This disclosure generally relates to a sunroof apparatus for a vehicle.

BACKGROUND DISCUSSION

A known sunroof apparatus for a vehicle is disclosed, for example, in JP2000-108676A, which will be hereinafter referred to as Reference 1. The sunroof apparatus disclosed in Reference 1 is a so-called outer sliding sunroof including a link mechanism for supporting a movable panel. Specifically, the link mechanism includes a rear lift link performing a swinging motion by a sliding operation of a first shoe, a front lift link performing a swinging motion by a sliding operation of a second shoe, and a connecting rod connecting the rear lift link and the second shoe so that the second shoe is slidably operated (i.e., performs the sliding operation) by the swinging motion of the rear lift link. In a case where the first shoe is slidably operated (i.e., performs the sliding operation), the rear link performs the swinging motion to lift up a rear end of the movable panel. During the aforementioned process, the swinging motion of the rear lift link is transmitted to the second shoe via the connecting rod. The resulting sliding operation of the second shoe causes the front lift link to perform the swinging motion to thereby lift up a front end of the movable panel. As a result, the movable panel is tilted up (i.e., performs a tilt-up operation).

Thereafter, the first shoe and the second shoe are slidably operated so that the movable panel slides outward (above a roof portion of a vehicle) while the movable panel is maintained to be tilted up (i.e., maintained in a tilt-up state). An opening formed at the roof portion is brought to an open state accordingly. At this time, the rear lift link performs the swinging motion by a function of an engagement structure provided between the rear lift link and the first shoe. Thus, because of specification of the engagement structure, the movable panel may be slowly tilted-up.

According to the sunroof apparatus disclosed in Reference 1, a moving amount (i.e., an operation stroke) of the first shoe or the like by which the movable panel is brought to a fully open state from a fully closed state is specifically the moving amount by which the movable panel is brought to the fully open state via the tilt-up state from the fully closed state. Thus, in a case where the moving amount of the first shoe or the like by which the movable panel is brought to the tilt-up state from the fully closed state (hereinafter also referred to as a tilt operation stroke) increases, the moving amount of the first shoe or the like by which the movable panel is brought to the fully open state, i.e., an amount of opening of the movable panel, may be difficult to be secured.

On the other hand, because the tilt operation stroke corresponds to an area of a high load state where the movable panel moves upward and downward, it is desirable for the tilt operation stroke to be elongated. When it is assumed that the tilt operation stroke is shortened, a load per unit operation stroke increases, which may result in an enlargement of an electric drive source (for example, a motor) for driving the first shoe or the like.

According to a sunroof apparatus for a vehicle serving as an outer sliding sunroof disclosed in JP4109583B which will be hereinafter referred to as Reference 2, it is proposed that a guide rail on which a shoe slidably moves projects forward in a state to penetrate through a front frame (housing). Accordingly, a supporting span of the movable panel may be widened while the opening amount of the movable panel increases or without deterioration of the opening amount of the movable panel.

Nevertheless, an effect obtained by the increase of the opening amount of the movable panel by the penetration of the guide rail through the front frame, for example, is insignificant. The opening amount of the movable panel is still difficult to be secured.

A need thus exists for a sunroof apparatus for a vehicle which is not susceptible to the drawback mentioned above.

SUMMARY

According to an aspect of this disclosure, a sunroof apparatus for a vehicle includes a movable panel configured to open and close an opening formed at a roof of a vehicle, a guide rail provided at each edge portion of the opening in a vehicle width direction and being extended in a front-rear direction of the vehicle, a support bracket provided at each edge portion of the movable panel in the vehicle width direction, a first sliding member connected to the support bracket to be movable along the guide rail, the first sliding member being driven to move by a drive source, a second sliding member provided to be movable along the guide rail and connected to the support bracket at an opposite side in the vehicle width direction from a side at which the first sliding member is provided, the second sliding member integrally moving with the movable panel in a state where a tilt operation of the movable panel is allowed, a check mechanism restricting a movement of the movable panel in the front-rear direction in a case where the first sliding member moves in a front direction of the vehicle in a fully closed state of the movable panel to bring the movable panel to a tilt-up state, the check mechanism releasing the restriction of the movement of the movable panel in the front-rear direction while maintaining the tilt-up state of the movable panel in a case where the first sliding member moves in the rear direction after moving further in the front direction in the tilt-up state of the movable panel, an engagement and disengagement switching mechanism including a first member supported by one of the first sliding member and the second sliding member and a second member supported by the other of the first sliding member and the second sliding member, the engagement and disengagement switching mechanism bringing the first member and the second member to engage with each other by a pressing effect between the first member and the second member so that the second sliding member moves integrally with the first sliding member in a case where the first sliding member moves in the rear direction after moving further in the front direction in the tilt-up state of the movable panel, a holding portion provided at the first sliding member, and a retention portion provided at the second sliding member and held to be non-movable in the vehicle width direction by the holding portion in a case where the first member and the second member are engaged with each other.

According to another aspect of this disclosure, a sunroof apparatus for a vehicle includes a movable panel configured to open and close an opening formed at a roof of a vehicle, a guide rail provided at each edge portion of the opening in a vehicle width direction and being extended in a front-rear direction of the vehicle, a support bracket provided at each edge portion of the movable panel in the vehicle width direction, a first sliding member connected to the support bracket to be movable along the guide rail, the first sliding member being driven to move by a drive source, a second sliding member provided to be movable along the guide rail and connected to the support bracket at an opposite side in the vehicle width direction from a side at which the first sliding member is provided, the second sliding member integrally moving with the movable panel in a state where a tilt operation of the movable panel is allowed, a check mechanism restricting a movement of the movable panel in the front-rear direction in a case where the first sliding member moves in a front direction of the vehicle in a fully closed state of the movable panel to bring the movable panel to a tilt-up state, the check mechanism releasing the restriction of the movement of the movable panel in the front-rear direction while maintaining the tilt-up state of the movable panel in a case where the first sliding member moves in the rear direction after moving further in the front direction in the tilt-up state of the movable panel, an engagement and disengagement switching mechanism including a first member supported by one of the first sliding member and the second sliding member and a second member supported by the other of the first sliding member and the second sliding member, the engagement and disengagement switching mechanism bringing the first member and the second member to engage with each other by a pressing effect between the first member and the second member so that the second sliding member moves integrally with the first sliding member in a case where the first sliding member moves in the rear direction after moving further in the front direction in the tilt-up state of the movable panel, and a pressing portion provided at the second sliding member to protrude towards the support bracket, the pressing portion pressing the support bracket towards the first sliding member in the vehicle width direction in a case where the movable panel is in an open state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment will be explained with reference to the attached drawings. In the following, a front-rear direction corresponds to a vehicle front-rear direction, and an upper side and a lower side correspond to an upper side and a lower side in a vehicle height direction respectively. Further, a vehicle inner side and a vehicle outer side correspond to an inner side in a vehicle width direction towards a vehicle cabin and an outer side in the vehicle width direction away from the vehicle cabin respectively.

Figure 8:
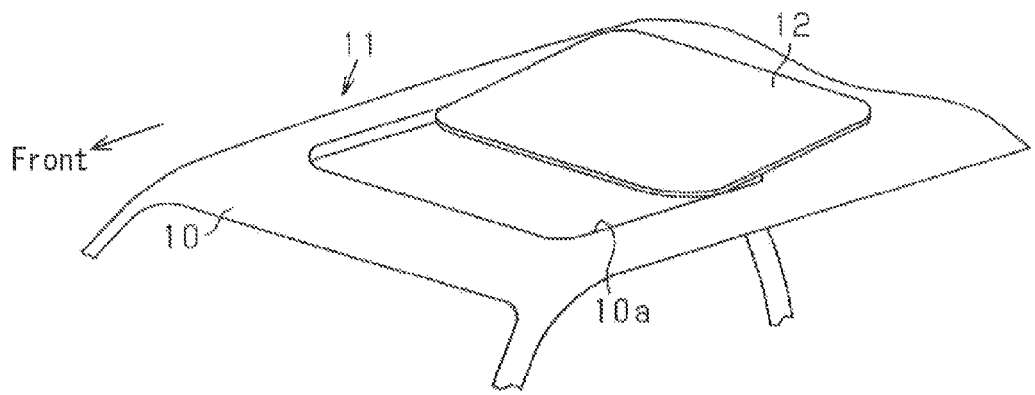
FIG. 8 is a perspective view of a roof at which the sunroof apparatus according to the embodiment is mounted and which is viewed in an obliquely upward direction.

As illustrated in FIG. 8, a substantially square or rectangular opening 10a is formed at a roof 10 of a vehicle such as an automobile, for example, and a sunroof apparatus 11 is mounted at the roof 10. The sunroof apparatus 11 includes a movable panel 12 substantially in a square or rectangular form made of glass plate, for example. The movable panel 12 moves in the front-rear direction for opening and closing the opening 10a.

The movable panel 12 is mounted at the roof 10 so as to selectively perform a tilt-up operation in which a rear portion of the movable panel 12 is lifted up or raised with reference to a front portion thereof and a slide operation in which the movable panel 12 slides in the front-rear direction. The sunroof apparatus 11 in the embodiment is a so-called outer sliding sunroof so that the movable panel 12 slides (performs the slide operation) while being maintained to be tilted-up (i.e., in a tilt-up state) during an opening and closing operation of the movable panel 12 for opening and closing the opening 10a.

Figure 9:
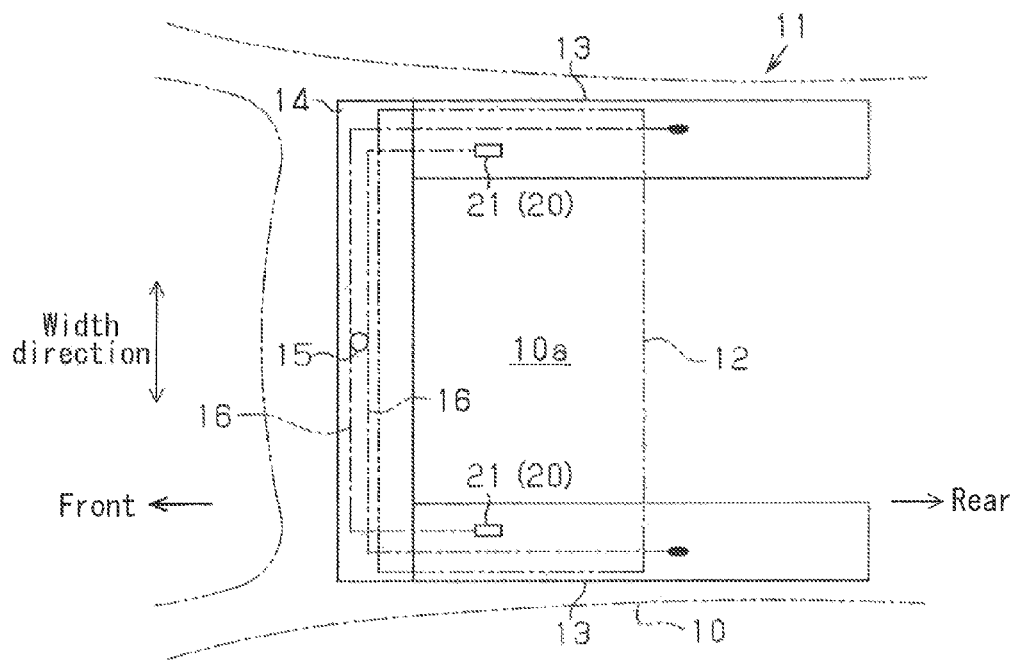
FIG. 9 is a plan view of the sunroof apparatus.

A configuration of the sunroof apparatus 11 related to the opening and closing operation of the movable panel 12 will be explained below. As illustrated in FIG. 9, a pair of guide rails 13 is provided at opposed edge portions of the opening 10a in the vehicle width direction. Each of the guide rails 13, which is made of aluminum alloy extruded material, for example, extends in the front-rear direction while including a constant cross section in a longitudinal direction of the guide rail 13. Functional components 20 are supported and guided relative to the respective guide rails 13 to be movable in the front-rear direction. The movable panel 12 is bridged between the functional components 20 at the respective guide rails 13 so as to be connected and supported at the functional components 20. The functional components 20 moves in the front-rear direction along the guide rails 13 to thereby bring the movable panel 12 to tilt-up or slide.

Respective front edges of the guide rails 13 are connected to each other by a front housing 14 that extends in the vehicle width direction. An electric drive source 15 such as an electric motor serving as a drive source and including an output gear, for example, is provided at a substantially intermediate portion of the front housing 14 in a longitudinal direction thereof. The electric drive source 15 is connected to the functional components 20 via a pair of drive belts 16 made of resin material, for example, and substantially formed in a strap form so as to simultaneously move the functional components 20 provided at the respective guide rails 13 in the front-rear direction.

Figure 3A:
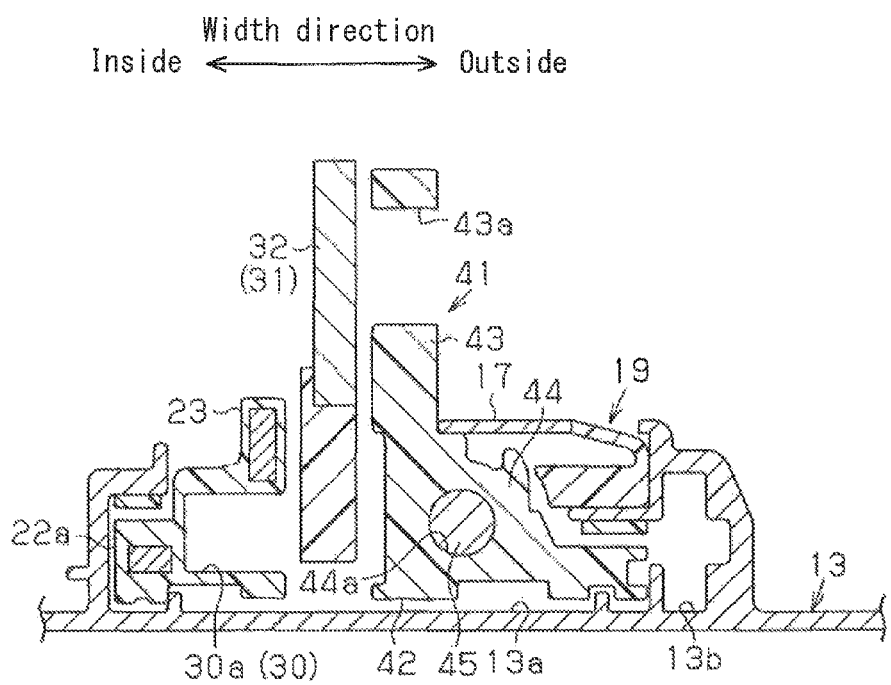
FIG. 3A is a cross-sectional view taken along line IIIA-IIIA in FIG. 2A.
Figure 3B:
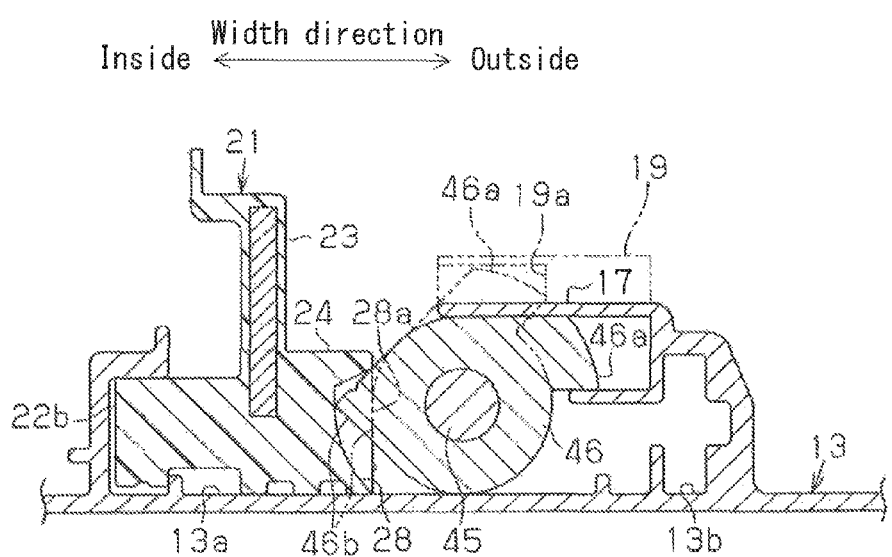
FIG. 3B is a cross-sectional view taken along line IIIB-IIIB in FIG. 2B.

As illustrated in FIGS. 3A and 3B, each of the guide rails 13 includes a first rail portion 13a including a substantially C-shape cross section opening upward and a second rail portion 13b disposed adjacent to the first rail portion 13a at the vehicle outer side thereof. The second rail portion 13b, which includes a substantially T-shape cross section in cooperation with a side wall of the first rail portion 13a, is connected to the first rail portion 13a via an opening formed at the side wall of the first rail portion 13a. In each of the guide rails 13, a guide portion 17 in a flange form is formed at an upper side of a portion of the first rail portion 13a at the vehicle outer side (i.e., a vehicle outer side portion of the first rail portion 13a).

Figure 1:
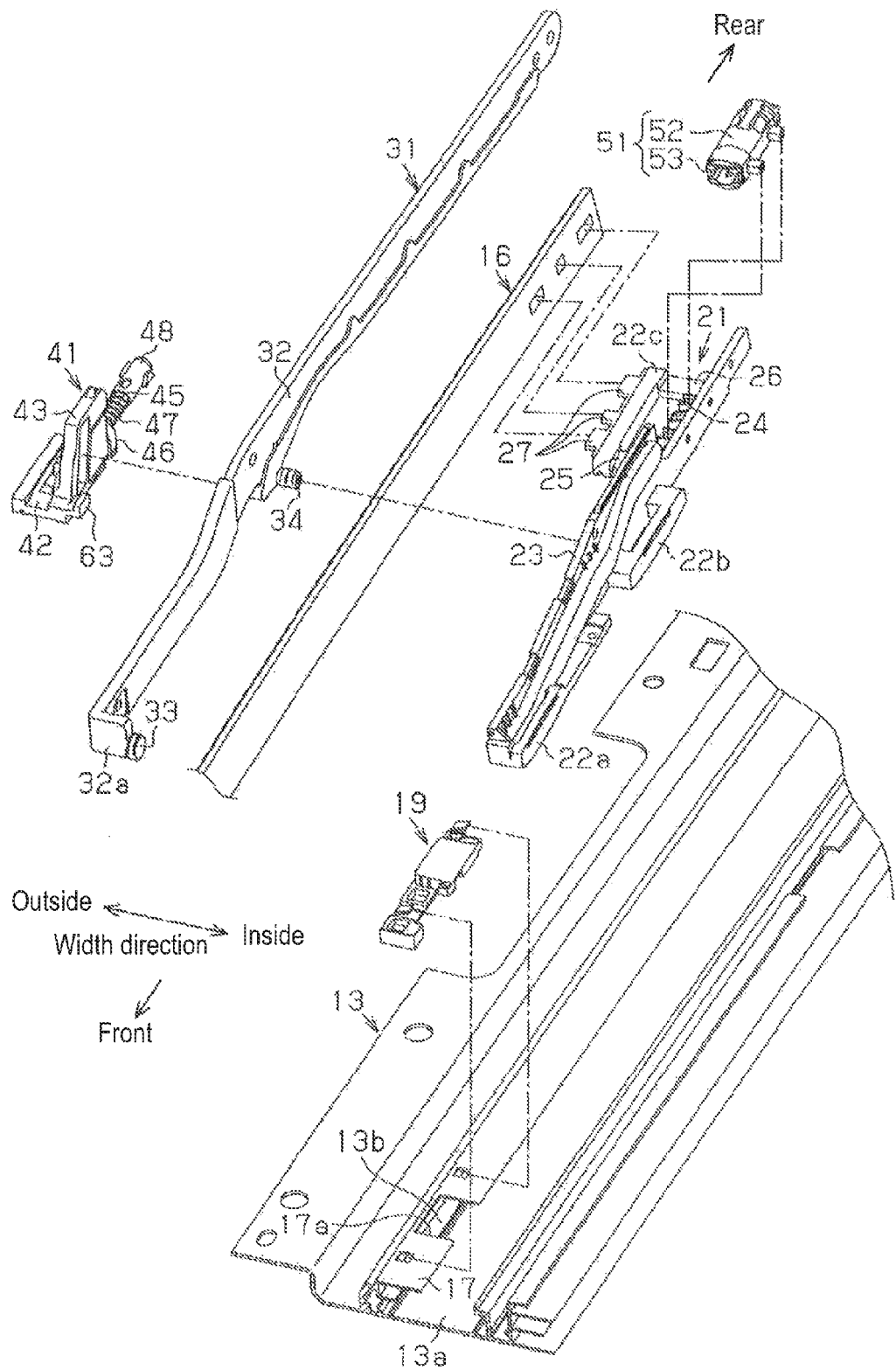
FIG. 1 is an exploded perspective view of a sunroof apparatus for a vehicle according to an embodiment disclosed here.
Figure 4:
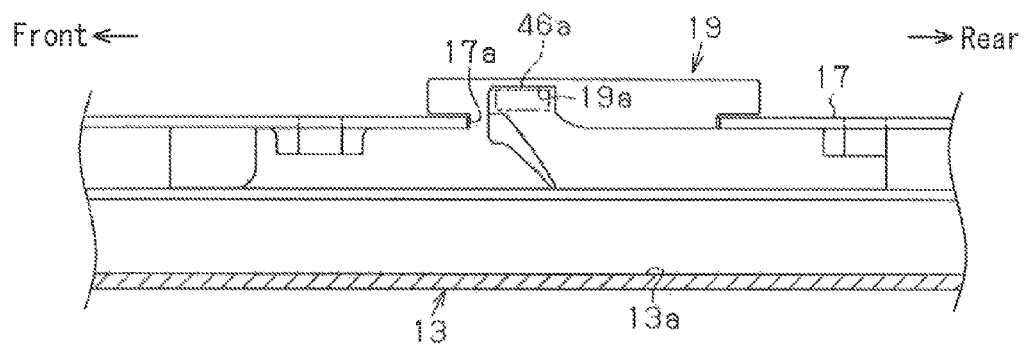
FIG. 4 is a side view illustrating a guide block and a peripheral structure of the guide block.

As illustrated in FIGS. 1 and 4, a cut-out portion 17a is formed at a predetermined position of the guide portion 17 closer to the front side of the vehicle. Then, a guide block 19 is fixed to the guide rail 13 in a state to be placed at the vehicle outer side portion of the first rail portion 13a and fitted to the guide portion 17 via the cut-out portion 17a. The guide block 19 is formed in a hook form by including an engagement groove 19a continuously formed from an upper side to a lower side of the guide portion 17 at the rear side of the vehicle. The engagement groove 19a is inclined downward towards the rear side of the vehicle and is connected, via a lower end of the engagement groove 19a, to a lower side of the guide portion 17.

Figure 6:
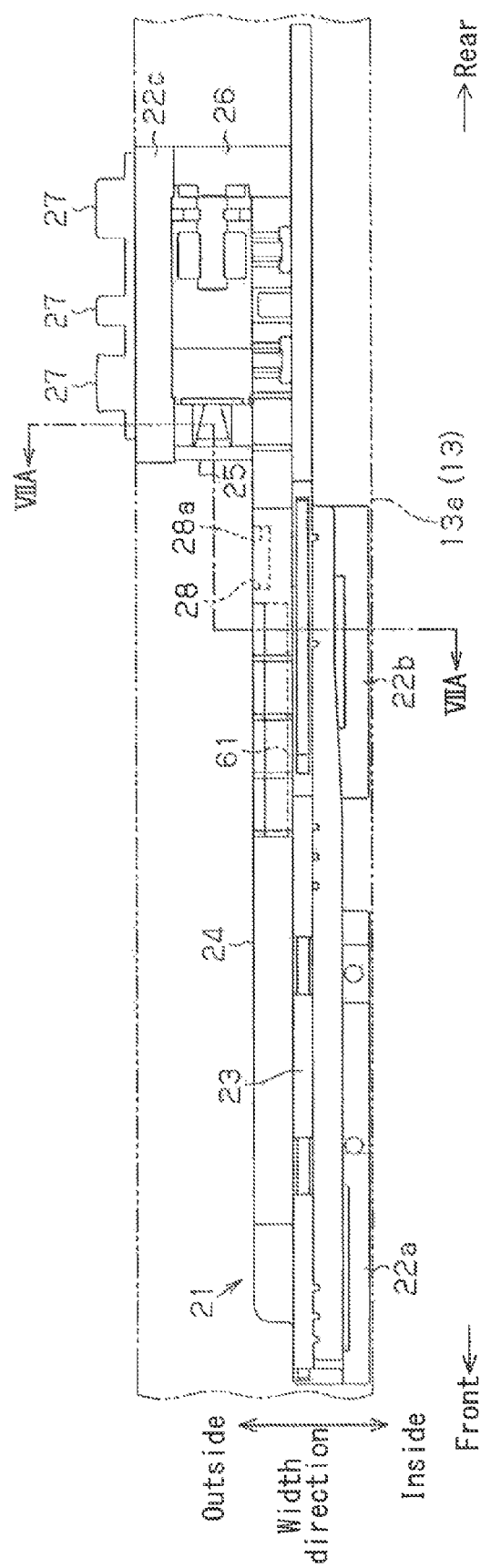
FIG. 6 is a plan view of a drive shoe at which a fixation cam is provided.

As illustrated in FIG. 1, a drive shoe 21 is mounted to each of the guide rails 13 (specifically, to the first rail portion 13a) so as to be movable in the front-rear direction. The drive shoe 21 serving as a first sliding member is formed, for example, by metallic plate and resin which are integrated. As also illustrated in FIG. 6, the drive shoe 21 includes a pair of shoe portions 22a and 22b disposed apart from each other in the front-rear direction to slide on a portion of the first rail portion 13a at the vehicle inner side (i.e., a vehicle inner side portion of the first rail portion 13a), and a shoe portion 22c sliding on the vehicle outer side portion of the first rail portion 13a (i.e., at an upper left side in FIG. 1). The shoe portion 22c is provided at the rear side of the shoe portion 22b. The drive shoe 21 also includes a vertical wall portion 23, a projection wall portion 24, a connection wall portion 25, and a connection wall portion 26. The vertical wall portion 23 is formed to stand upward at a substantially intermediate portion and closer to the vehicle inner side of the first rail portion 13a so as to connect the shoe portions 22a and 22b each other by extending in the front-rear direction. The projection wall portion 24 is formed to protrude by a substantially constant distance from a lower end portion of the vertical wall portion 23 to the vehicle outer side. The projection wall portion 24 extends in the front-rear direction over an entire length of the vertical wall portion 23 in a longitudinal direction thereof. The connection wall portion 25 connects a rear end portion of the projection wall portion 24 and a front end portion of the shoe portion 22c in the vehicle width direction. The connection wall portion 26 is disposed adjacent to the projection wall portion 24 in the rear of the vehicle to connect a rear end portion of the vertical wall portion 23 and a rear end portion of the shoe portion 22c in the vehicle width direction.

The drive shoe 21 includes plural projecting pieces 27 (for example, three projecting pieces 27 in the embodiment) penetrating through the shoe portion 22c to enter the inside of the second rail portion 13b provided at the vehicle outer side relative to the first rail portion 13a. The projecting pieces 27 are connected to the corresponding drive belt 16 sliding on the second rail portion 13b in the front-rear direction. That is, the electric drive source 15 is connected to each of the functional components 20 via the drive shoe 21. Because each of the drive belts 16 is driven by the electric drive source 15 to move along the guide rail 13 (specifically, the second rail portion 13b) in the front-rear direction, the drive shoe 21 moves in the front-rear direction in a state where the shoe portions 22a and 22b slide on the vehicle inner side portion of the first rail portion 13a and the shoe portion 22c slides on the vehicle outer side portion of the first rail portion 13a.

As illustrated in FIGS. 3B and 6, the drive shoe 21 includes an engagement recess portion 28 provided at a substantially intermediate portion of the projection wall portion 24 in the longitudinal direction thereof and at the front side of the vehicle relative to the connection wall portion 25. The engagement recess portion 28 is recessed to the vehicle inner side from an end surface of the projection wall portion 24 at the vehicle outer side. A rear end surface of the engagement recess portion 28 forms a restriction portion 28a.

Figure 2A:
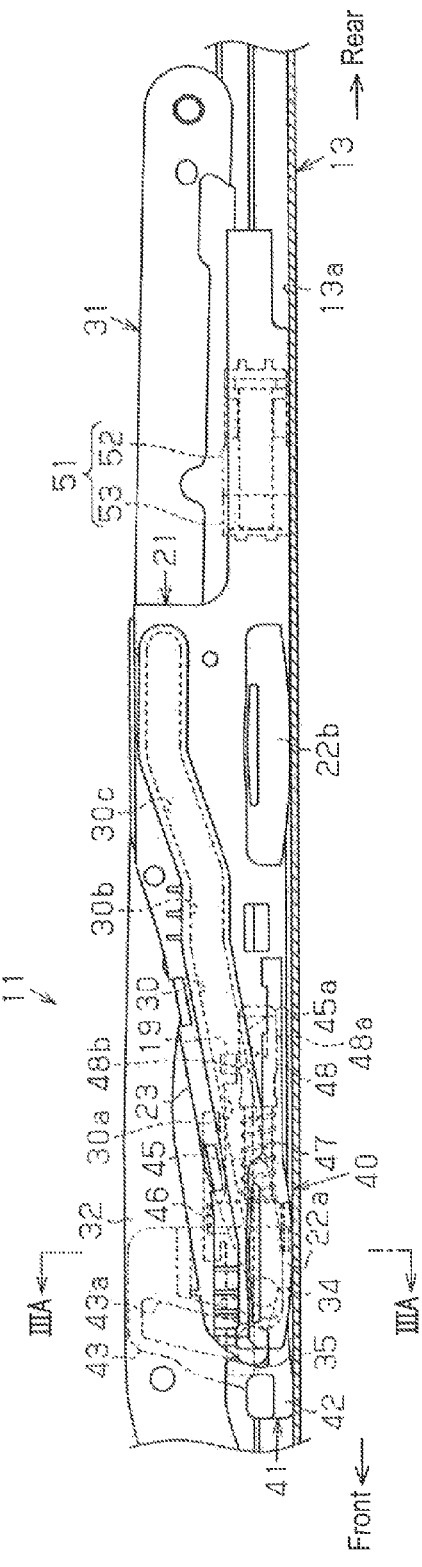
FIG. 2A is a side view illustrating a fully closed state of a movable panel.
Figure 2B:
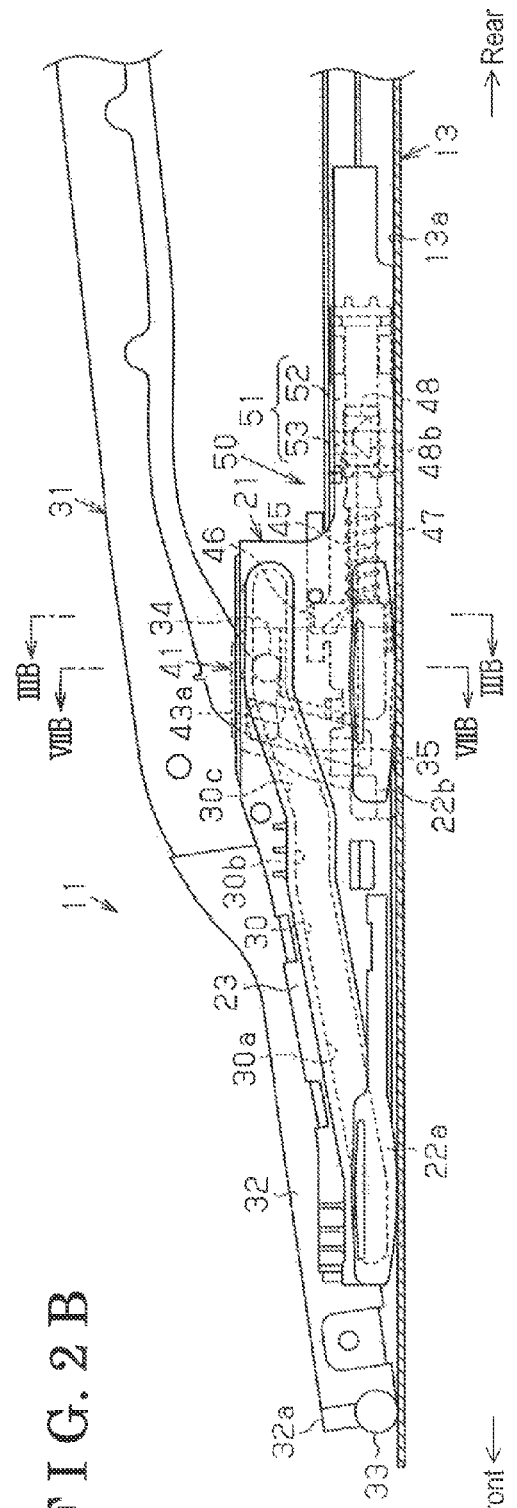
FIG. 2B is a side view illustrating a second tilt-up state of the movable panel.

As illustrated in FIGS. 2A and 2B, a guide groove 30 that extends in the front-rear direction is formed at the vertical wall portion 23 to be recessed to the vehicle inner side from an end surface of the vertical wall portion 23 at the vehicle outer side. The guide groove 30 includes a first inclination portion 30a, a linear portion 30b, and a second inclination portion 30c those of which are integrally formed. The first inclination portion 30a is inclined upward towards the rear side of the vehicle. The linear portion 30b is connected to a rear end of the first inclination portion 30a to extend substantially in parallel to the guide rail 13. The second inclination portion 30c is connected to a rear end of the linear portion 30b to incline upward towards the rear side of the vehicle.

A pair of support brackets 31 is fixed to a lower surface of the movable panel 12 in a state to be disposed at opposed edge portions of the movable panel 12 in the vehicle width direction. Each of the support brackets 31, which is made of metallic plate, for example, extends over a substantially entire length of the movable panel 12. The support bracket 31 includes a vertical wall portion 32 in a plate form vertically provided at the lower surface of the movable panel 12. The vertical wall portion 32 is disposed adjacent to the vertical wall portion 23 of the drive shoe 21 at the vehicle outer side thereof so as to be positioned at the upper side of the projection wall portion 24 of the drive shoe 21.

An attachment piece 32a is formed at a front end of the vertical wall portion 32 to bend towards the vehicle inner side. A driven shoe 33 made of resin material and formed in a substantially column is connected to an end of the attachment piece 32a to be rotatable about an axis line extending in the vehicle width direction. The driven shoe 33 is provided to be movable on the first rail portion 13a of the guide rail 13 in the front-rear direction at the front side of the drive shoe 21 (specifically, the shoe portions 22a and 22b). The movable panel 12 supported by the support brackets 31 is tilted-up (i.e., performs the tilt-up operation) so that a rear portion of the support bracket 31 (i.e., of the movable panel 12) is raised with reference to a front portion at which the vertical wall portion 32 is connected to the driven shoe 33 (the attachment piece 32a) and is tilted-down (i.e., performs a tilt-down operation) so that the rear portion of the support bracket 31 (the movable panel 12) is lowered with reference to the front portion. The drive shoe 21 and the driven shoe 33 constitute the functional component 20. The tilt-up operation and the tilt-down operation will be hereinafter collectively referred to as the tilt operation.

A guide pin 34 projecting to the vehicle inner side is integrally formed at a front portion of the support bracket 31 (specifically, the vertical wall portion 32). The guide pin 34 is movably fitted to the guide groove 30. As illustrated in FIG. 2A, the guide pin 34 is configured to be disposed at a lower end of the guide groove 30 (specifically, the first inclination portion 30a) in a fully closed state of the movable panel 12. Thus, in a case where the drive shoe 21 moves to the front side along the guide rail 13 in the aforementioned configuration, the guide pin 34 that is guided by the guide groove 30 moves upward at the first inclination portion 30a to reach the linear portion 30b. At this time, because of the rising of the support bracket 31 (the guide pin 34) with reference to the drive shoe 21, the movable panel 12 rotates relative to the front portion of the support bracket 31, which results in the tilt-up operation of the movable panel 12 in which the rear portion of the support bracket 31 (the movable panel 12) is raised with reference to the front portion thereof. The movable panel 12 is brought in a first tilt-up state accordingly.

In a case where the drive shoe 21 moves further to the front side along the guide rail 13 (i.e., the first rail portion 13a), as illustrated in FIG. 2B, the guide pin 34 that is guided by the guide groove 30 moves upward at the second inclination portion 30c to reach an end (a rear end) thereof. At this time, because of the rising of the support bracket 31 (the guide pin 34) with reference to the drive shoe 21, the movable panel 12 further rotates relative to the front portion of the support bracket 31, which results in the tilt-up operation of the movable panel 12 in which the rear portion of the support bracket 31 (i.e., the movable panel 12) is further raised with reference to the front portion thereof. The movable panel 12 is brought in a second tilt-up state accordingly.

On the other hand, in a case where the drive shoe 21 moves to the vehicle rear side in the tilt-up state of the movable panel 12 (i.e., in the first tilt-up state or the second tilt-up state), the drive shoe 21 is operated substantially in reverse order from the aforementioned order. A locking pin 35 is integrally formed at a front end portion of the support bracket 31 (the vertical wall portion 32) at the front side of the guide pin 34. The locking pin 35 formed in a substantially elongated column projects to the vehicle outer side.

As illustrated in FIG. 1, a slide check 41 is attached to the guide rail 13 (the first rail portion 13a) to be positioned adjacent to the vertical wall portion 32 at the vehicle outer side thereof. The slide check 41, which is made of resin material, for example, is movable in the front-rear direction. As illustrated in FIG. 3A, the slide check 41 includes a shoe portion 42 and a vertical wall portion 43. The shoe portion 42 slides on the vehicle outer side portion of the first rail portion 13a at the front side of the shoe portion 22c. The vertical wall portion 43 is formed to stand upwardly between the vertical wall portion 32 of the support bracket 31 and the guide portion 17 in the vehicle width direction. The slide check 41 is movable along the guide rail 13 in the front-rear direction by the shoe portion 42 sliding on the vehicle outer side portion of the first rail portion 13a in a state where the position of the slide check 41 in the vehicle width direction is determined by the vertical wall portion 32 and the guide portion 17 those of which make contact with or come closer to the vertical wall portion 43.

As illustrated in FIGS. 2A and 2B, a bore 43a formed by an elongated bore is formed at a front end portion of the vertical wall portion 43 so that the locking pin 35 is movably fitted to the bore 43a. The bore 43a is formed to linearly upwardly incline towards the rear side of the vehicle. The slide check 41 is connected to the support bracket 31 via the locking pin 35 that is fitted to the bore 43a. The slide check 41 secures the aforementioned operation state of the drive shoe 21 on the guide rail 13 by the locking pin 35 that moves freely within the bore 43a in a case where the movable panel 12 supported by the support bracket 31 is tilted-up or tilted-down. That is, the slide check 41 allows the movable panel 12 to be brought to the tilt-up state or the fully closed state in association with the movement of the drive shoe 21 in the front-rear direction by the locking pin 35 that moves freely within the bore 43a. In addition, in a case where the tilt operation of the movable panel 12 is prohibited, the slide check 41 restricts the movement of the locking pin 35 (the support bracket 31) in the front-rear direction at the bore 43a. Accordingly, the slide check 41 integrally moves with the movable panel 12 that is supported by the support bracket 31 in the front-rear direction (corresponding to the slide operation) by moving in the front-rear direction.

As illustrated in FIG. 3A, the slide check 41 includes a build-up portion 44 formed in a substantially quarter column connecting the shoe portion 42 and the vertical wall portion 43 at a lower side of the guide portion 17. The build-up portion 44 includes a support recess portion 44a in a substantially circular form recessed from a rear end surface of the build-up portion 44 towards the vehicle front side. A support shaft 45 formed in a substantially column of which a center line extends in the front-rear direction is inserted to be positioned within the support recess portion 44a in a non-rotatable manner. As illustrated in FIGS. 2A and 2B, a rotation check 46 substantially in a disc form is supported at a front end portion of the support shaft 45 that projects from the slide check 41 so as to be disposed adjacent to the slide check 41. Accordingly, an axis line of the rotation check 46 coincides with the center line of the support shaft 45.

As illustrated in FIG. 3B, the rotation check 46 includes an engagement projection 46a in a substantially sawtooth form at a predetermined angular position (i.e., an angular position to the right in FIG. 3B) with reference to the support shaft 45 to project radially outwardly. In addition, the rotation check 46 includes a pressed portion 46b in a triangular tooth form at a predetermined angular position (i.e., an angular position to the left in FIG. 3B) with reference to the support shaft 45 to project radially outwardly. As illustrated by a chain double-dashed line in FIG. 3B, the engagement projection 46a engages with the engagement groove 19a of the guide block 19 and the pressed portion 46b makes contact with or comes closer to a bottom surface of the first rail portion 13a and an outer side surface of the projection wall portion 24 in the fully closed state of the movable panel 12, for example. Thus, in the fully closed state of the movable panel 12, the rotation check 46 is restricted to rotate by the bottom surface of the first rail portion 13a, for example, in a state where the engagement projection 46a engages with the engagement groove 19a of the guide block 19. The rotation check 46 is inhibited from moving in the front-rear direction and the slide check 41 is also inhibited from moving in the front-rear direction together with the rotation check 46. In addition, the support bracket 31 connected to the slide check 41 via the bore 43a, for example, is inhibited from moving in the front-rear direction so that the movable panel 12 is only allowed to move from the fully closed state to the tilt-up state. The guide block 19, the slide check 41, the rotation check 46, and the like constitute a check mechanism 40.

As mentioned above, the engagement recess portion 28 is formed at the projection wall portion 24 of the drive shoe 21. Thus, in a case where the engagement recess portion 28 reaches a position at which the pressed portion 46b is provided in association with the movement of the drive shoe 21 in the front direction of the vehicle, the rotation check 46 is allowed to rotate within the engagement recess portion 28. In the aforementioned state, when the rotation check 46 moves together with the drive shoe 21 in the rear direction of the vehicle, the rotation check 46 rotates in a clockwise direction as illustrated by a solid line in FIG. 3B because the engagement projection 46a is guided by the engagement groove 19a. Then, the engagement projection 46a enters below the guide portion 17 to be sandwiched between the guide portion 17 and the first rail portion 13a. The rotation of the rotation check 46 is restricted accordingly. At the same time, the pressed portion 46b engages with the engagement recess portion 28. At this time, the pressed portion 46b is disposed on a movement locus of the restriction portion 28a of the drive shoe 21 in the front-rear direction.

As illustrated in FIG. 2A, an enlarged diameter portion 45a substantially in a disc form is formed at a rear end of the support shaft 45. A rotation cam 48 is supported at a rear end portion of the support shaft 45 to be disposed adjacent to the enlarged diameter portion 45a at the front side thereof. The rotation cam 48, which is made of resin material, for example, serves as a second member. The rotation cam 48 includes a body portion 48a in a substantially cylindrical form that includes an inner diameter substantially equal to an outer diameter of the support shaft 45 and an outer diameter substantially equal to an outer diameter of the enlarged diameter portion 45a. The rotation cam 48 is supported at the support shaft 45 via the body portion 48a. Accordingly, an axis line of the rotation cam 48 coincides with the center line of the support shaft 45. That is, the rotation cam 48 is disposed to be coaxial with the rotation check 46.

A coil spring 47 is wound on the support shaft 45 between the rotation check 46 and the rotation cam 48. The coil spring 47 is compressed in the front-rear direction corresponding to an axial direction of the coil spring 47. The coil spring 47 biases the rotation check 46 in a direction where the rotation check 46 makes contact with the slide check 41 and biases the rotation cam 48 in a direction where the rotation cam 48 makes contact with the enlarged diameter portion 45a. The rotation cam 48 is inhibited from disengaging rearward of the vehicle by the enlarged diameter portion 45a.

Figure 5:
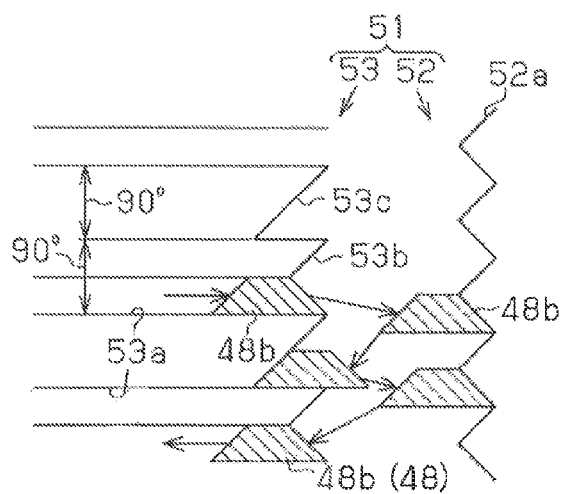
FIG. 5 is an explanatory view illustrating an operation of an engagement and disengagement switching mechanism by deploying the engagement and disengagement switching mechanism in a circumferential direction.

As illustrated in FIG. 5, the rotation cam 48 includes a pair of second cam teeth 48b formed to project at an outer peripheral surface of the body portion 48a. Each of the second cam teeth 48b is formed in a substantially isosceles trapezoid where each long side and each short side extend in the front-rear direction. The pair of second cam teeth 48b faces each other in a radial direction of the rotation cam 48 relative to the axis line thereof. Each of the second cam teeth 48b extends within a range of a smaller angle (i.e., 45° in the present embodiment) than a predetermined angle (i.e., 90° in the present embodiment) in a circumferential direction of the rotation cam 48 relative to the axis line thereof.

As illustrated in FIG. 1, a fixation cam 51 made of resin material, for example, and serving as a first member is placed at the drive shoe 21 in a state to bridge between the connection wall portions 25 and 26. As illustrated in FIG. 2A, the fixation cam 51 is disposed away from the rotation cam 48 in a state where the drive shoe 21 is disposed at a position that is achieved when the movable panel 12 is shifted at least from the fully closed state to the first tilt-up state. As illustrated in FIG. 2B, positions of the fixation cam 51 and the rotation cam 48 in the front-rear direction overlap each other in a state where the drive shoe 21 is disposed at a position that is achieved when the movable panel 12 is shifted to the second tilt-up state. The fixation cam 51 includes a first fixation member 52 in a substantially cylindrical form with a bottom and a second fixation member 53 in a substantially cylindrical form. The first fixation member 52 is disposed at a side away from the slide check 41 while the second fixation member 53 is disposed at a side closer to the slide check 41.

As illustrated in FIG. 5, plural first cam teeth 52a formed by substantially triangular teeth are formed at a front end portion (i.e., an opening end portion) of the first fixation member 52 so as to be disposed at each aforementioned predetermined angle (i.e., 90°) around an axis line of the first fixation member 52 in a state to protrude and to be recessed (in a projection and recess manner) in an axial direction thereof. A pair of open portions 53a is formed at an inner peripheral portion of the second fixation member 53 so that each of the open portions 31a is continuously formed along an axial direction thereof. The open portions 53a face each other in a radial direction of the second fixation member 53. A rear end portion of each of the open portions 53a at an upper side in FIG. 5 is gradually inclined to expand towards the rear end to thereby form a guide portion 53b. Each of the open portions 53a that is continuously formed over an entire axial length of the second fixation member 53 extends within the range of the equal angle (i.e., 45°) to each of the first cam teeth 52a in the circumferential direction relative to the axis line of the fixation cam 51. Each of the open portions 53a including the guide portion 53b extends within the range of the aforementioned predetermined angle (i.e., 90°) in the circumferential direction.

A pair of locking portions 53c is formed at a rear end portion (i.e., an opening end portion) of the second fixation member 53 between the open portions 53a in the circumferential direction. Each of the locking portions 53c is inclined to the front side from the open portion 53a towards the guide portion 53h. In addition, each of the locking portions 53c extends within the range of the aforementioned predetermined angle (90°) in the circumferential direction relative to the axis line of the fixation cam 51. Both apexes of the first cam teeth 52a at which the first cam teeth 52a change the direction of extension in the front-rear direction face circumferentially intermediate portions of the locking portions 53c in the front-rear direction. That is, a phase difference of a predetermined angle smaller than the aforementioned predetermined angle (90°) is specified between both apexes of the locking portions 53c at which the locking portions 53c change the direction of extension in the front-rear direction and the both apexes of the first cam teeth 52a at which the first cam teeth 52a change the direction of extension in the front-rear direction.

In the aforementioned configuration, in a state where the rotation cam 48 (the slide check 41) is disposed away from the fixation cam 51 in the front-rear direction (for example, until the movable panel 12 is shifted to the first tilt-up state from the fully closed state), angular positions of the second cam teeth 48b are retained by a biasing force of the coil spring 47, for example, so as to coincide with angular positions of the open portions 53a. Therefore, in a case where the fixation cam 51 moves in the front direction of the vehicle together with the drive shoe 21 so as to shift the movable panel 12 to the tilt-up state, the second cam teeth 48b pass through the open portions 53a to be pressed by the first cam teeth 52a because a moving path (a path) of the second cam teeth 48b to the first cam teeth 52a is opened by the open portions 53a as illustrated in FIG. 5. At this time, the second cam teeth 48b are guided by the first cam teeth 52a to rotate by the aforementioned phase difference between the locking portions 53c and the first cam teeth 52a. Accordingly, in a case where the fixation cam 51 thereafter moves in the rear direction of the vehicle together with the drive shoe 21, the moving path of the second cam teeth 48b to the first cam teeth 52a (a path for retracting from the first cam teeth 52a) is closed by the locking portions 53c.

Accordingly, in a case where the fixation cam 51 moves in the rear direction of the vehicle together with the drive shoe 21 so that the movable panel 12 slides rearward of the vehicle (i.e., an opening operation is performed), the second cam teeth 48b are guided to rotate by the locking portions 53c to engage therewith as illustrated in FIG. 5. As a result, the rotation cam 48 and the fixation cam 51 engage with each other by a pressing effect between the fixation cam 51 and the rotation cam 48 so that the slide check 41 integrally moves to the vehicle rear side. In addition, the support bracket 31 that is connected to the slide check 41 via the locking pin 35 also integrally moves in the rear direction of the vehicle. The rotation cam 48, the fixation cam 51, and the like constitute an engagement and disengagement switching mechanism 50.

Figure 7A:
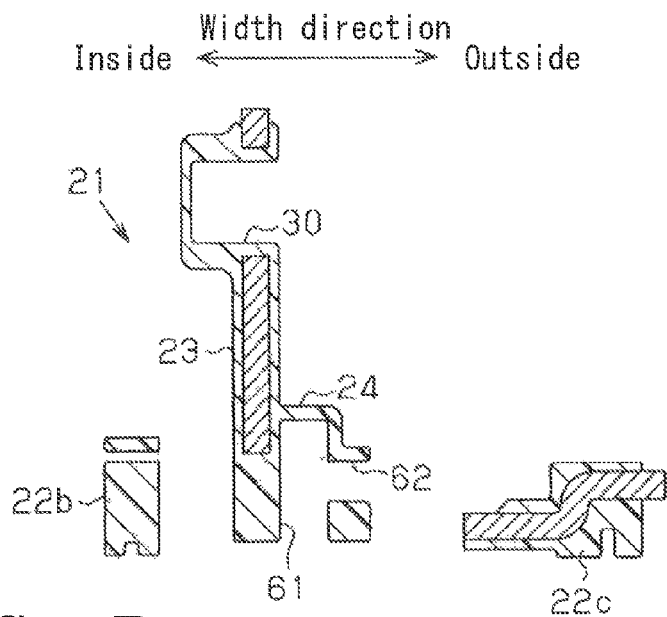
FIG. 7A is a cross-sectional view taken along line VIIA-VIIA in FIG. 6.

The drive shoe 21 and the slide check 41 will be explained in detail. As illustrated in FIGS. 6 and 7A, a holding recess portion 61 is formed at the drive shoe 21 to be disposed adjacent to the engagement recess portion 28 at the front side thereof. The holding recess portion 61 includes a substantially U-shape cross section opening downward. An outer side surface of the vertical wall portion 23 at the vehicle outer side is used as an inner side surface of the holding recess portion 61 at the vehicle inner side. A connection recess portion 62 is formed at the projection wall portion 24 within a range corresponding to the holding recess portion 61 in the front-rear direction. The connection recess portion 62 connects between the vehicle outer side of the projection wall portion 24 and the inside of the holding recess portion 61 in the vehicle width direction at an intermediate portion in the vehicle height direction of the projection wall portion 24. Each of the holding recess portion 61 and the connection recess portion 62 is also connected in the front direction of the vehicle. A void obtained by a projection of a region defined by the holding recess portion 61 and the connection recess portion 62 at an upper side than a lower end of the connection recess portion 62 to the vehicle front side is configured not to overlap the projection wall portion 24 (the drive shoe 21). The holding recess portion 61 and the connection recess portion 62 constitute a holding portion.

Figure 7B:
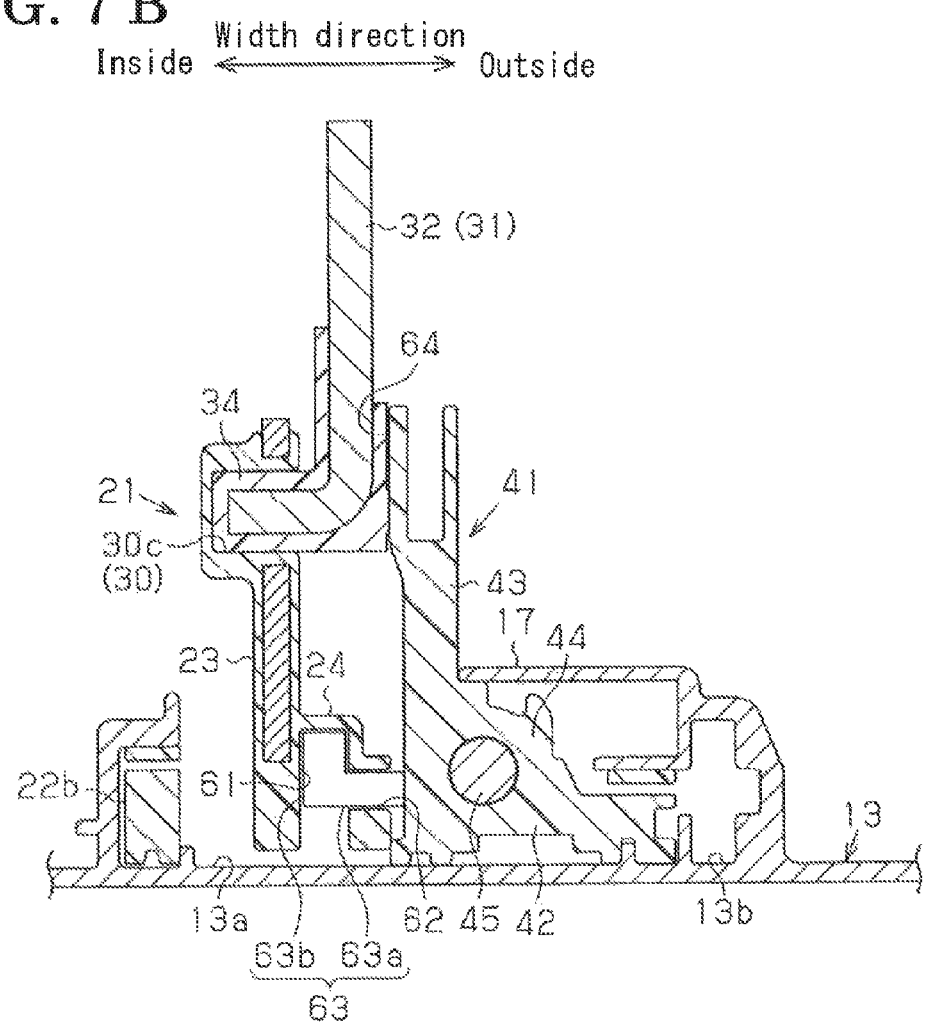
FIG. 7B is a cross-sectional view taken along line VIIB-VIIB in FIG. 2B.

As illustrated in FIGS. 1 and 7B, a holding projection 63 serving as a retention portion is formed at a front lower end of the vertical wall portion 43 of the slide check 41 so as to project to the vehicle inner side. The holding projection 63 includes a connection portion 63a and a hook portion 63b. The connection portion 63a is formed to project in a substantially rectangular plate form in the front direction of the vehicle in a state to be supported in a cantilevered manner at an inner side surface of the vertical wall portion 43 at the vehicle inner side. The hook portion 63b is connected to an end of the connection portion 63a to extend upwardly in a plate form. The connection portion 63a and the hook portion 63b are configured to be fitted to the connection recess portion 62 and the holding recess portion 61 respectively.

In a case where the drive shoe 21 is disposed at a position at which the movable panel 12 is shifted at least to the first tilt-up state from the fully closed state, the connection portion 63a and the hook portion 63b of the slide check 41 are disengaged from the connection recess portion 62 and the holding recess portion 61 of the drive shoe 21 respectively. In a case where the drive shoe 21 is disposed at a position at which the movable panel 12 is shifted to the second tilt-up state, the connection portion 63a and the hook portion 63b are fitted to the connection recess portion 62 and the holding recess portion 61 respectively.

As illustrated in FIG. 7B, a pressing portion 64 in a table form is formed at an upper end portion of the vertical wall portion 43 to protrude towards the vertical wall portion 23 of the drive shoe 21 (i.e., to the vehicle inner side) in the vehicle width direction. The pressing portion 64 is in press-contact with the outer side surface of the vertical wall portion 32 including the guide pin 34 to press the support bracket 31 towards the vertical wall portion 23 in the vehicle with direction in a case where the guide pin 34 of the support bracket 31 reaches the end of the second inclination portion 30c by moving up at the guide groove 30, i.e., in a case where the movable panel 12 is in the open state, for example. That is, in a case where the guide pin 34 of the support bracket 31 is positioned in a range from the linear portion 30b to the first inclination portion 30a by moving down at the guide groove 30 (i.e., in a case where the movable panel 12 is in a range from the fully closed state to the first tilt-up state), a clearance corresponding to the protrusion of the pressing portion 64 is formed between the vertical wall portions 32 and 43 in the vehicle width direction.

An inner wall surface of the guide groove 30 at the vehicle inner side is gradually bulged towards the vehicle outer side so that a distance between the inner wall surface of the guide groove 30 and the vertical wall portion 32 gradually decreases towards the upper side (configuration of the inner wall surface of the guide groove 30 at the vehicle inner side is omitted in the drawings). The inner wall surface of the guide groove 30 is in press-contact with the guide pin 34 in a case where the guide pin 34 of the support bracket 31 reaches the end of the second inclination portion 30c by moving up at the guide groove 30 (i.e., the movable panel 12 is in the open state, for example) to thereby press the support bracket 31 towards the vertical wall portion 43 in the vehicle width direction. That is, in a case where the guide pin 34 of the support bracket 31 is positioned in a range from the linear portion 30b to the first inclination portion 30a by moving down at the guide groove 30 (i.e., in a case where the movable panel 12 is in a range from the fully closed state to the first tilt-up state), a clearance corresponding to the bulge of the inner wall surface of the guide groove 30 is formed between the guide pin 34 and the inner wall surface of the guide groove 30 at the vehicle inner side.

Accordingly, in the open state of the movable panel 12, for example, the support bracket 31 is sandwiched and disposed between the pressing portion 64 of the slide check 41 and the inner wall surface of the guide groove 30 at the vehicle inner side to thereby restrain looseness or backlash of the support bracket 31, together with the movable panel 12, in the vehicle width direction.

The aforementioned looseness (backlash) of the movable panel 12 is generated because the opening 10a is formed in a substantially isosceles trapezoid so that a rear end of the opening 10a is greater in width (i.e., widen) than a front end thereof for the purpose of smooth opening and closing operation of the movable panel 12, for example. That is, in the open state of the movable panel 12, a clearance (i.e., a fitting allowance) corresponding to the widening at the rear end relative to the front end of the opening 10a is formed between the opening 10a and the movable panel 12, which may result in a cause of the aforementioned looseness.

On the other hand, in the closed state of the movable panel 12, a known seal member is disposed between the movable panel 12 and the opening 10a to thereby inhibit looseness of the movable panel 12 (and the support bracket 31) in the vehicle width direction. Alternatively, in the first tilt-up state of the movable panel 12, the aforementioned seal member is disposed at least between the front end of the movable panel 12 and the opening 10a, thereby inhibiting looseness of the movable panel 12 (and the support bracket 31) in the vehicle width direction.

The operation of the sunroof apparatus 11 in the embodiment will be explained. In the closed state of the movable panel 12, the rotation check 46 is restricted from rotating by the bottom surface of the first rail portion 13a, for example, in a state where the engagement projection 46a engages with the engagement groove 19a of the guide block 19. Therefore, the movement of the rotation check 46 in the front-rear direction is restricted and also the movement of the slide check 41 in the front-rear direction is restricted together with the rotation check 46. Further, the movement of the support bracket 31 connected to the slide check 41 via the bore 43a, for example, in the front-rear direction is restricted. As a result, the movable panel 12 is only allowed to be tilted-up, i.e., the rear portion of the support bracket 31 is lifted up with reference to the front portion thereof.

In the aforementioned state, in a case where the drive shoe 21 moves in the front direction of the vehicle, the locking pin 35 moves freely within the bore 43a of the slide check 41 so as to move upward along the bore 43a. In addition, the guide pin 34 guided by the guide groove 30 moves upward at the first inclination portion 30m and reaches the linear portion 30b. In association with the aforementioned operation, the support bracket 31 (the guide pin 34) moves upward relative to the drive shoe 21 so that the movable panel 12 is shifted and bought to the first tilt-up state.

As mentioned above, in a case where the drive shoe 21 is disposed at least at the position that is achieved in a case where the movable panel 12 is shifted from the fully closed state to the first tilt-up state, the rotation cam 48 and the fixation cam 51 of the engagement and disengagement switching mechanism 50 are positioned apart from each other in the front-rear direction. Thus, in a case where the drive shoe 21 moves in the rear direction of the vehicle in the first tilt-up state of the movable panel 12, the locking pin 35 moves freely within the bore 43a of the slide check 41 so as to move downward along the bore 43a. At the same time, the guide pin 34 guided by the guide groove 30 moves downward at the first inclination portion 30a to reach the end (lower end) of the first inclination portion 30a. In association with the aforementioned operation, the support bracket 31 (the guide pin 34) moves downward relative to the drive shoe 21 so that the movable panel 12 is shifted to the fully closed state after tilted-down, i.e., after the tilt-down operation in which the rear portion of the support bracket 31 (the movable panel 12) is lowered with reference to the front portion thereof. That is, as long as the movable panel 12 is shifted between the fully closed state and the first tilt-up state, the movable panel 12 is only tilted (tilted-up and tilted-down) in association with the movement of the drive shoe 21 in the front-rear direction.

On the other hand, in a case where the drive shoe 21 moves further in the front direction of the vehicle in the first tilt-up state of the movable panel 12, the locking pin 35 moves freely within the bore 43a of the slide check 41 so as to further move upward along the bore 43a. In addition, the guide pin 34 guided by the guide groove 30 moves up at the second inclination portion 30c to reach the end (upper end) thereof. In association with the aforementioned operation, the support bracket 31 (the guide pin 34) moves further upward relative to the drive shoe 21 to thereby shift the movable panel 12 to the second tilt-up state. Further, in association with the movement of the drive shoe 21 in the front direction of the vehicle, the engagement recess portion 28 reaches the position at which the pressed portion 46b of the rotation check 46 is provided, thereby allowing the rotation of the rotation check 46.

At this time, the positions of the rotation cam 48 and the fixation cam 51 of the engagement and disengagement switching mechanism 50 overlap each other in the front-rear direction. Thus, the second cam teeth 48b of the rotation cam 48 pass through the open portions 53a of the fixation cam 51 to be pressed by the first cam teeth 52a because the moving path of the second cam teeth 48b to the first cam teeth 52a is cleared and opened by the open portions 53a. Then, the second cam teeth 48b are guided by the first cam teeth 52a to rotate by the aforementioned phase difference between the locking portions 53c and the first cam teeth 52a.

Thereafter, in a case where the drive shoe 21 moves in the rear direction of the vehicle, the second cam teeth 48b of the rotation cam 48 are guided to rotate by the locking portions 53c of the second fixation member 53 to engage with the locking portions 53c. Because of the engagement between the rotation cam 48 and the fixation cam 51, the rotation check 46 and the slide check 41 attempt and try to integrally move with the fixation cam 51 in the rear direction of the vehicle.

At this time, the engagement projection 46a of the rotation check 46, the rotation check 46 being allowed to rotate within the engagement recess portion 28, rotates and enters below the guide portion 17 while being guided by the engagement groove 19a of the guide block 19. The rotation check 46 is restricted from rotating in the aforementioned state, i.e., maintains the aforementioned state. Accordingly, the restriction of movement of the slide check 41 in the front-rear direction is released and also the restriction of movement of the support bracket 31 connected to the slide check 41 via the bore 43a, for example, in the front-rear direction is released. At the same time, the pressed portion 46b of the rotation check 46 enters the engagement recess portion 28 to be disposed on the movement locus of the restriction portion 28a in the front-rear direction.

Accordingly, when the drive shoe 21 moves to the vehicle rear side, the rotation check 46 and the slide check 41 integrally move with the fixation cam 51 in the rear direction. At this time, because a distance in the front-rear direction between the rotation check 46 (the slide check 41) and the fixation cam 51 is kept constant, a distance between the drive shoe 21 and the support bracket 31 in the front-rear direction is kept constant. Thus, the movable panel 12 supported by the support bracket 31 moves in the rear direction of the vehicle while being held in the second tilt-up state to thereby open the opening 10a. The movable panel 12 is brought to the open state accordingly.

As mentioned above, in a case where the drive shoe 21 is disposed at the position that is achieved in a case where the movable panel 12 is shifted to the second tilt-up state, the holding projection 63 (the connection portion 63a and the hook portion 63b) of the slide check 41 is fitted and inserted to the connection recess portion 62 and the holding recess portion 61 of the drive shoe 21. Thus, the aforementioned fitting state is also maintained in the open state of the movable panel 12. In a case where looseness or backlash occurs at the support bracket 31 together with the movable panel 12 at the vehicle outer side, the support bracket 31 being sandwiched and disposed between the slide check 41 and the drive shoe 21 (specifically, the vertical wall portion 23), the slide check 41 is pressed by the support bracket 31 to the vehicle outer side. Then, the slide check 41 is likely to laterally fall to the vehicle outer side while the guide portion 17 is being deformed, for example. Nevertheless, in the open state of the movable panel 12, the holding projection 63 of the slide check 41 is fitted and inserted to the connection recess portion 62 and the holding portion 61 of the drive shoe 21 so that the slide check 41 is held in the non-movable manner in the vehicle width direction. Accordingly, the aforementioned lateral falling of the slide check 41 is restrained.

In a case where looseness or backlash occurs at the support bracket 31 together with the movable panel 12 at the vehicle inner side, the support bracket 31 being sandwiched and disposed between the slide check 41 (the vertical wall portion 43) and the drive shoe 21, the drive shoe 21 is pressed by the support bracket 31 to the vehicle inner side. Alternatively, the slide check 41 may be pulled to the vehicle outer side during the aforementioned lateral falling of the slide check 41. Nevertheless, because the drive shoe 21 is held over the substantially entire length of the first rail portion 13a in the vehicle width direction by the shoe portions 22a, 22b, and 22c, the position of the drive shoe 21 may be firmly maintained.

In addition, in the open state of the movable panel 12, the support bracket 31 is sandwiched and disposed in the vehicle width direction between the pressing portion 64 of the slide check 41 and the inner wall surface of the guide groove 30 at the vehicle inner side. Thus, looseness or backlash of the support bracket 31 is restrained, together with the movable panel 12, in the vehicle width direction.

In the open state of the movable panel 12, the rotation of the rotation check 46 is restricted in a state where the engagement projection 46a enters below the guide portion 17. The pressed portion 46b of the rotation check 46 is disposed on the moving locus of the restriction portion 28a in the front-rear direction. Accordingly, in the aforementioned state, when the drive shoe 21 moves in the front direction of the vehicle, the restriction portion 28a presses the pressed portion 46b so that the slide check 41 together with the rotation check 46 integrally moves with the drive shoe 21 in the front direction. The integral movement of the slide check 41 with the drive shoe 21 is obtained so that the second cam teeth 48b of the rotation cam 48 and the first cam teeth 52a of the first fixation member 52 are disposed apart from each other in the front-rear direction to inhibit the first cam teeth 52a from pressing the second cam teeth 48b in a case where the drive shoe 21 moves in the front direction of the vehicle in the open state of the movable panel 12. Even in this case, because of the constant distance in the front-rear direction between the slide check 41 and the fixation cam 51, the distance in the front-rear direction between the drive shoe 21 and the support bracket 31 is maintained to be constant. As a result, the movable panel 12 supported by the support bracket 31 closes the opening 10a while being maintained in the second tilt-up state.

In association with the closing operation of the movable panel 12, the movable panel 12 approaches an initial state where the movable panel 12 is shifted to the second tilt-up state. Then, the engagement projection 46a is guided by the engagement groove 19a so that the rotation check 46 rotates in a state where the engagement projection 46a enters an upper end portion of the engagement groove 19a while the pressed portion 46b disengages from the engagement recess portion 28. The rotation check 46 is restricted from rotating in the aforementioned manner, i.e., maintains the aforementioned state. Accordingly, the slide check 41 together with the rotation check 46 is restricted from moving in the front direction of the vehicle. The support bracket 31 connected to the slide check 41 via the bore 43a, for example, is also restricted from moving in the front direction of the vehicle.

In the aforementioned configuration, when the drive shoe 21 moves further in the front direction of the vehicle, the engagement recess portion 28 passes through the pressed portion 46b and the outer side surface of the projection wall portion 24 at the vehicle outer side makes contact with or comes closer to the pressed portion 46b, thereby restricting the rotation of the rotation check 46 in a direction where the engagement projection 46a disengages from the engagement groove 19a. At the same time, the fixation cam 51 moves further forward relative to the rotation cam 48 which is restricted from rotating forward together with the slide check 41. Then, the first cam teeth 52a press the second cam teeth 48b so that the second cam teeth 48b are guided by the first cam teeth 52a to rotate by the phase difference between the locking portions 53c and the first cam teeth 52a. Accordingly, in a case where the fixation cam 51 thereafter moves in the rear direction of the vehicle together with the drive shoe 21, the second cam teeth 48b are guided to rotate by the guide portions 53b, and the moving path of the second cam teeth 48b (the path for retracting from the first cam teeth 52a) to the first cam teeth 52a is opened by the open portions 53a. While the second cam teeth 48b pass through the open portions 53a, the rotation cam 48 releases the engagement with the second fixation member 53 (the fixation cam 51). The fixation cam 51 moves in the rear direction of the vehicle together with the drive shoe 21 while leaving, i.e., not together with, the rotation cam 48, and the like.

At this time, the locking pin 35 moves freely within the bore 43a of the slide check 41 so as to move downward along the bore 43a and the guide pin 34 is guided to move downward along the guide groove 30. As a result, the movable panel 12 is tilted-down and brought to the fully closed state via the first tilt-up state.

In a case where the drive shoe 21 moves in the rear direction of the vehicle in a state where the engagement between the rotation cam 48 and the fixation cam 51 is released, the engagement recess portion 28 reaches but promptly passes through the pressed portion 46b so that the rotation of the rotation check 46 in the direction where the engagement projection 46a disengages from the engagement groove 19a is maintained to be restricted.

According to the embodiment, in a case where the drive shoe 21 moves in the rear direction of the vehicle after moving further in the front direction of the vehicle in the first tilt-up state of the movable panel 12, the restriction of the movement of the movable panel 12 in the front-rear direction is released while the second tilt-up state of the movable panel 12 is maintained by the check mechanism 40. In addition, in a case where the drive shoe 21 moves in the rear direction of the vehicle after moving further in the front direction of the vehicle in the first tilt-up state of the movable panel 12, the fixation cam 51 and the rotation cam 48 engage with each other by the pressing effect therebetween to thereby integrally move the slide check 41 with the drive shoe 21. Then, the movable panel 12 is movable in the rear direction of the vehicle together with the drive shoe 21, the slide check 41, and the support bracket 31. Because of the engagement between the fixation cam 51 and the rotation cam 48, the movable panel 12 is opened while being maintained in the second tilt-up state in a case where the drive shoe 21 moves in the rear direction of the vehicle. In this case, a maximum moving amount of the drive shoe 21, or the like, that specifies the fully open state of the movable panel 12 is not restricted or constrained by a moving amount of the drive shoe 21 in an opposite direction (i.e., in the front direction of the vehicle) for achieving the tilt-up state of the movable panel 12. Therefore, the maximum moving amount of the drive shoe 21 or the like that specifies the fully open state of the movable panel 12, i.e., the opening amount of the movable panel 12, may increase.

Specifically, in the open state of the movable panel 12, when looseness or backlash occurs at the support bracket 31 together with the movable panel 12 at the vehicle outer side, the support bracket 31 being sandwiched and disposed between the slide check 41 and the drive shoe 21 (specifically, the vertical wall portion 23), the slide check 41 connected to the support bracket 31 at an opposite side in the vehicle width direction (i.e., at the vehicle outer side) from a side at which the drive shoe 21 (the vertical wall portion 23) is provided is likely to laterally fall by being pressed by the support bracket 31 to the vehicle outer side. Nevertheless, in the engagement state between the fixation cam 51 and the rotation cam 48. i.e., in the open state of the movable panel 12 for example, the holding projection 63 of the slide check 41 is retained at the holding recess portion 61 and the connection recess portion 62 of the drive shoe 21 in the non-movable manner in the vehicle width direction. Accordingly, the lateral falling of the slide check 41 may be restrained.

In the open state of the movable panel 12, the pressing portion 64 presses the support bracket 31 towards the drive shoe 21 in the vehicle width direction so that the support bracket 31 may be firmly sandwiched and disposed between the slide check 41 and the drive shoe 21 in the vehicle width direction. As a result, looseness or backlash of the movable panel 12 and the support bracket 31 in the vehicle width direction may be restrained.

In the embodiment, the second cam teeth 48b passing through the open portions 53a are pressed by the first cam teeth 52a in a case where the drive shoe 21 moves further in the front direction in the first tilt-up state of the movable panel 12 and then pressed by the locking portions 53c when the drive shoe 21 moves in the rear direction of the vehicle. Thus, the second cam teeth 48b rotate by the predetermined angle (90°) to engage with the locking portions 53c. Accordingly, because of the engagement between the locking portions 53c and the second cam teeth 48b, the fixation cam 51 engages with the rotation cam 48 so that the movable panel 12 integrally moves with the drive shoe 21 together with the slide check 41 and the support bracket 31 in a case where the drive shoe 21 moves in the rear direction of the vehicle. Accordingly, the fixation cam 51 and the rotation cam 48 are engageable with each other by a simple configuration of the engagement and disengagement switching mechanism 50 in which the second cam teeth 48b which pass through the open portions 53a are sequentially pressed by the first cam teeth 52a and the locking portions 53c to rotate by the predetermined angle.

In a case where the drive shoe 21 moves in the front direction of the vehicle in the open state of the movable panel 12, the movable panel 12 is held in the second tilt-up state while the restriction of the movement of the movable panel 12 in the front-rear direction is released until the movable panel 12 returns to an initial restored state corresponding to a state in which the movable panel 12 is shifted from the fully closed state to the second tilt-up state by the check mechanism 40. Then, the pressed portion 46b of the rotation check 46 is pressed by the restriction portion 28a so that the movable panel 12 integrally moves with the drive shoe 21 (in addition to the slide check 41 and the support bracket 31) in the front direction of the vehicle. The movable panel 12 is closed while being maintained in the second tilt-up state accordingly. In this case, by the pressing of the restriction portion 28a relative to the pressed portion 46b (the movable panel 12), the second cam teeth 48b are restricted from being pressed by the first cam teeth 52a, which may avoid the operation of the engagement and disengagement switching mechanism 50 from being unstable due to the rotation of the second cam teeth 48b, for example.

Thereafter, once the movable panel 12 returns to the aforementioned restored state, the movement of the movable panel 12 in the front-rear direction is restricted by the check mechanism 40 in a case where the drive shoe 21 moves further in the front direction of the vehicle, and the holding of the movable panel 12 in the second tilt-up state is released. In addition, the second cam teeth 48b are pressed by the first cam teeth 52a in a case where the drive shoe 21 moves further in the front direction of the vehicle in the restored state of the movable panel 12 and are then guided to the open portions 53a in a case where the drive shoe 21 thereafter moves in the rear direction of the vehicle. The second cam teeth 48b rotate by the predetermined angle (90°) to pass through the open portions 53a. Accordingly, because the engagement between the fixation cam 51 and the rotation cam 48 is released, the drive shoe 21 moves in the rear direction of the vehicle while leaving, i.e., without being together with, the movable panel 12, the support bracket 31 and the slide check 41. Therefore, by the simple configuration in which the second cam teeth 48b are pressed against the first cam teeth 52a and guided by the open portions 53a (the guide portions 53b) so as to rotate by the predetermined angle, the engagement and disengagement switching mechanism 50 may release the engagement between the fixation cam 51 and the rotation cam 48.

In association with the movement of the drive shoe 21 in the rear direction of the vehicle, the movable panel 12 is brought to the fully closed state as the rear portion thereof is lowered with reference to the front portion. In this case, the moving amount of the drive shoe 21 in a case where the movable panel 12 is shifted from the tilt-up state to the fully closed state may be sufficiently secured, thereby reducing a load per unit movement amount of the drive shoe 21 (a motor output) and avoiding enlargement of the electric drive source 15.

Specifically, in a case where a function is provided for determining that something is caught by in the movable panel 12 in a case where fluctuation in rotation speed of the motor exceeds a predetermined threshold value (which will be hereinafter referred to as a reverse rotation load) in association with the opening and closing operation of the movable panel 12 so as to reverse the movable panel 12, a small fluctuation of rotation speed in a normal operation state may result in a reduction of reverse rotation load. That is, even though the reverse rotation load is reduced, a possibility of wrong determination that something is caught in the movable panel 12 by the aforementioned function may be reduced. In this case. EU regulations requiring the reverse rotation load equal to or greater than 100N may be satisfied. The movable panel 12 may be configured to be automatically closed.

In the embodiment, the restriction of the movement of the movable panel 12 in the front-rear direction and the release of the aforementioned restriction by the check mechanism 40 are switched by the engagement and disengagement between the engagement projection 46a and the engagement groove 19a in association with the rotation of the rotation check 46 around the support shaft 45. On the other hand, the engagement between the fixation cam 51 and the rotation cam 48 is achieved by the further movement of the drive shoe 21 in the front direction of the vehicle, i.e., the movement of the support shaft 45 along the center line thereof, in the first-tilt up state of the movable panel 12. Accordingly, the restriction of the movement of the movable panel 12 and the release of the restriction by the check mechanism 40, and the engagement between the fixation cam 51 and the rotation cam 48 are both achieved in association with the movement of the drive shoe 21 in the front-rear direction along the moving direction thereof. The rotation cam 48 and the rotation check 46 are disposed around the support shaft 45 in an intensive manner to thereby achieve downsizing of the entire sunroof apparatus 11.

In the embodiment, the rotation cam 48 is rotatably connected to the slide check 41 of the check mechanism 40 so that the rotation cam 48 is disposed at the check mechanism 40 in an intensive manner, which results in downsizing of the entire sunroof apparatus 11. Specifically, the rotation check 46 and the second cam teeth 48b are disposed to be coaxial with each other, which results in further downsizing of the entire sunroof apparatus 11.

In the embodiment, the maximum moving amount of the drive shoe 21 or the like, that specifies the tilt-up state of the movable panel 12 is not limited by the moving amount of the drive shoe 21 in the opposite direction (i.e., in the rear direction of the vehicle) for shifting the movable panel 12 to the open state. Thus, the maximum moving amount of the drive shoe 21 or the like that specifies the tilt-up state of the movable panel 12, i.e., the opening amount of the movable panel 12 in the tilt-up state, may increase.

For example, in the process of assembling the sunroof apparatus 11 on the roof 10, the drive shoe 21 is assembled on the guide rail 13 in a state where the fixation cam 51 and the rotation cam 48 are engaged with each other so that the drive shoe 21 and the slide check 41 are tentatively assembled in a state where the holding projection 63 of the slide check 41 is fitted and inserted to the holding recess portion 61 and the connection recess portion 62 of the drive shoe 21. Accordingly, assembly performance of the drive shoe 21, and the like may improve.

The embodiment may be modified or changed as below. The pressing portion 64 of the slide check 41 may be bulged in a rib form.

In the embodiment, the pressing portion 64 of the slide check 41 may be omitted. That is, the inner side surface of the vertical wall portion 43 at the vehicle inner side may be formed to stand in a planar form. The holding projection 63 of the slide check 41 may be fitted and inserted to the holding recess portion 61 and the connection recess portion 62 (the holding portion) of the drive shoe 21 even in the fully closed state or the first tilt-up state of the movable panel 12.

The holding recess portion 61 and the connection recess portion 62 (the holding portion) of the drive shoe 21 may hold the holding projection 63 of the slide check 41 so that the holding projection 63 of the slide check 41 is inhibited from moving in a direction in which the slide check 41 is away from the support bracket 31 in the vehicle width direction.

The holding projection 63 of the slide check 41, and the holding recess portion 61 and the connection recess portion 62 (the holding portion) of the drive shoe 21 may be omitted. In the embodiment, the drive shoe 21 and the slide check 41 are connected to the support bracket 31 from the vehicle inner side and the vehicle outer side of the support bracket 31 respectively. At this time, arrangement relationship between the drive shoe 21 and the slide check 41 relative to the support bracket 31 may be reversed.

The number of the second cam teeth 48b and the arrangement of the second cam teeth 48b of the rotation cam 48 may be appropriately specified. In this case, then, the first cam teeth 52a, for example, may be provided to match the angle range in which the second cam teeth 48b are formed.

The linear portion 30b of the guide groove 30 may be omitted. In the embodiment, the restriction of the movement of the movable panel 12 and the release of the restriction by the check mechanism 40 are switched by the engagement and disengagement between the engagement projection 46a and the engagement groove 19a in association with the rotation of the rotation check 46. Alternatively, the restriction of the movement of the movable panel 12 and the release of the restriction may be switched by the movement of the rotation check 46 in the vehicle height direction or the width direction as long as the check mechanism 40 achieves the restriction of the movement of the movable panel 12 and the release of the restriction by an electric control, for example. The arrangement and configuration of the check mechanism 40, for example, may be appropriately specified.

In the embodiment, the rotation check 46 and the rotation cam 48 are integrally connected to the slide check 41. Alternatively, the rotation check 46 and the rotation cam 48 may be connected individually to a peripheral edge portion of the movable panel 12.

In the embodiment, the rotation check 46 and the engagement and disengagement switching mechanism 50 (the rotation cam 48 and the fixation cam 51) are arranged to be coaxial with each other. Alternatively, as long as axes of the rotation check 46, the rotation cam 48 and the fixation cam 51 extend in the front-rear direction, the rotation check 46 and the engagement and disengagement switching mechanism 50 (the rotation cam 48 and the fixation cam 51) are inhibited from being coaxial with each other.

In a case where the movable panel 12 is shifted from the open state to the closed state, the restriction portion 28a presses the pressed portion 46b of the rotation check 46. Alternatively, the restriction portion 28a may press an appropriate position at the movable panel 12 as long as no functional problems occur, for example.

In the embodiment, as the tilt-up state of the movable panel 12, the first tilt-up state and the second tilt-up state in which the movable panel 12 is further tilted-up than in the first tilt-up state are specified. Alternatively, the posture of the movable panel 12 in a case where the movable panel 12 is shifted from the fully closed state and the posture of the movable panel 12 in a case where the movable panel 12 slides on the guide rail 13 may coincide with each other.

The guide block 19 may be integrally formed at the guide rail 13.

In the embodiment, the slide check 41 includes the pressing portion 64 protruding towards the support bracket 31, the pressing portion 64 pressing the support bracket 31 towards the drive shoe 21 in the vehicle width direction in a case where the movable panel 12 is in the open state.

In addition, in the embodiment, the fixation cam 51 includes the first fixation member 52 including the plurality of first cam teeth 52a disposed at every predetermined angle around the axis line that extends in the front-rear direction and formed in a projection and recess manner in a direction of the axis line, the fixation cam 51 including the second fixation member 53 that is disposed at a side of the first fixation member 52 facing the rotation cam 48 and that includes the open portion 53a configured to open the pass to the first cam teeth 52a and the locking portion 53c configured to close the path to the first cam teeth 52a, each of the open portion 53a and the locking portion 53c being disposed at the every predetermined angle around the axis line. The rotation cam 48 is connected to be rotatable about the axis line and includes the second cam tooth 48b, the second cam tooth 48b passing through the open portion 53a to be pressed by one of the first cam teeth 52a in a case where the drive shoe 21 moves further in the front direction in the tilt-up state of the movable panel 12 and being pressed by the locking portion 53c in a case where the first shoe 21 thereafter moves in the rear direction so that the second cam tooth 48b rotates by the predetermined angle to engage with the locking portion 53c.

Further, in the embodiment, the check mechanism 40 maintains the movable panel 12 in the tilt-up state while releasing the restriction of the movement of the movable panel 12 in the front-rear direction until the movable panel 12 returns to the restored state the restored state in a case where the drive shoe 21 moves in the front direction of the vehicle in the open state of the movable panel 12, the initial restored state corresponding to a state in which the movable panel 12 is shifted to the tilt-up state from the fully closed state. The sunroof apparatus 11 further includes the restriction portion 28a restricting the second cam tooth 48b from being pressed by one of the first cam teeth 52a until the movable panel 12 returns to the restored state in a case where the drive shoe 21 moves in the front direction in the open state of the movable panel 12. The second cam tooth 48b is pressed by one of the first cam teeth 52a in a case where the drive shoe 21 moves further in the front direction in the restored state of the movable panel 12 and is guided to the open portion 53a in a case where the drive shoe 21 thereafter moves in the rear direction so that the second cam tooth 48b rotates by the predetermined angle to pass through the open portion 53a.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof apparatus for a vehicle, comprising:
    a movable panel configured to open and close an opening formed at a roof of a vehicle;
    a guide rail provided at each edge portion of the opening in a vehicle width direction and being extended in a front-rear direction of the vehicle;
    a support bracket provided at each edge portion of the movable panel in the vehicle width direction;
    a first sliding member connected to the support bracket to be movable along the guide rail, the first sliding member being driven to move by a drive source;
    a check mechanism including a second sliding member provided to be movable along the guide rail and connected to the support bracket at an opposite side in the vehicle width direction from a side at which the first sliding member is provided, the second sliding member integrally moving with the movable panel in a state where a tilt operation of the movable panel is allowed,
    wherein the check mechanism restricts a movement of the movable panel in the front-rear direction in a case where the first sliding member moves in a front direction of the vehicle in a fully closed state of the movable panel to bring the movable panel to a tilt-up state, the check mechanism releasing the restriction of the movement of the movable panel in the front-rear direction while maintaining the tilt-up state of the movable panel in a case where the first sliding member moves in the rear direction after moving further in the front direction in the tilt-up state of the movable panel;
    an engagement and disengagement switching mechanism including a first member supported by one of the first sliding member and the second sliding member and a second member supported by the other of the first sliding member and the second sliding member, the engagement and disengagement switching mechanism bringing the first member and the second member to engage with each other by a pressing effect between the first member and the second member so that the second sliding member moves integrally with the first sliding member in a case where the first sliding member moves in the rear direction after moving further in the front direction in the tilt-up state of the movable panel;
    a holding portion provided at the first sliding member; and
    a retention portion provided at the second sliding member and held to be non-movable in the vehicle width direction by the holding portion in a case where the first member and the second member are engaged with each other.

2. A sunroof apparatus for a vehicle, comprising:
    a movable panel configured to open and close an opening formed at a roof of a vehicle;
    a guide rail provided at each edge portion of the opening in a vehicle width direction and being extended in a front-rear direction of the vehicle;
    a support bracket provided at each edge portion of the movable panel in the vehicle width direction;
    a first sliding member connected to the support bracket to be movable along the guide rail, the first sliding member being driven to move by a drive source;
    a check mechanism including a second sliding member provided to be movable along the guide rail and connected to the support bracket at an opposite side in the vehicle width direction from a side at which the first sliding member is provided, the second sliding member integrally moving with the movable panel in a state where a tilt operation of the movable panel is allowed,
    wherein the check mechanism restricts a movement of the movable panel in the front-rear direction in a case where the first sliding member moves in a front direction of the vehicle in a fully closed state of the movable panel to bring the movable panel to a tilt-up state, the check mechanism releasing the restriction of the movement of the movable panel in the front-rear direction while maintaining the tilt-up state of the movable panel in a case where the first sliding member moves in the rear direction after moving further in the front direction in the tilt-up state of the movable panel;
    an engagement and disengagement switching mechanism including a first member supported by one of the first sliding member and the second sliding member and a second member supported by the other of the first sliding member and the second sliding member, the engagement and disengagement switching mechanism bringing the first member and the second member to engage with each other by a pressing effect between the first member and the second member so that the second sliding member moves integrally with the first sliding member in a case where the first sliding member moves in the rear direction after moving further in the front direction in the tilt-up state of the movable panel; and
    a pressing portion provided at the second sliding member to protrude towards the support bracket, the pressing portion pressing the support bracket towards the first sliding member in the vehicle width direction in a case where the movable panel is in an open state.

3. The sunroof apparatus according to claim 1, wherein the second sliding member includes a pressing portion protruding towards the support bracket, the pressing portion pressing the support bracket towards the first sliding member in the vehicle width direction in a case where the movable panel is in an open state.

4. The sunroof apparatus according to claim 1, wherein the first member includes a first fixation member including a plurality of first cam teeth disposed at every predetermined angle around an axis line that extends in the front-rear direction and formed in a projection and recess manner in a direction of the axis line, the first member including a second fixation member that is disposed at a side of the first fixation member facing the second member and that includes an open portion configured to open a pass to the first cam teeth and a locking portion configured to close the path to the first cam teeth, each of the open portion and the locking portion being disposed at the every predetermined angle around the axis line, and the second member is connected to be rotatable about the axis line and includes a second cam tooth, the second cam tooth passing through the open portion to be pressed by one of the first cam teeth in a case where the first sliding member moves further in the front direction in the tilt-up state of the movable panel and being pressed by the locking portion in a case where the first sliding member thereafter moves in the rear direction so that the second cam tooth rotates by the predetermined angle to engage with the locking portion.

5. The sunroof apparatus according to claim 2, wherein the first member includes a first fixation member including a plurality of first cam teeth disposed at every predetermined angle around an axis line that extends in the front-rear direction and formed in a projection and recess manner in a direction of the axis line, the first member including a second fixation member that is disposed at a side of the first fixation member facing the second member and that includes an open portion configured to open a pass to the first cam teeth and a locking portion configured to close the path to the first cam teeth, each of the open portion and the locking portion being disposed at the every predetermined angle around the axis line, and the second member is connected to be rotatable about the axis line and includes a second cam tooth, the second cam tooth passing through the open portion to be pressed by one of the first cam teeth in a case where the first sliding member moves further in the front direction in the tilt-up state of the movable panel and being pressed by the locking portion in a case where the first sliding member thereafter moves in the rear direction so that the second cam tooth rotates by the predetermined angle to engage with the locking portion.

6. The sunroof apparatus according to claim 3, wherein the first member includes a first fixation member including a plurality of first cam teeth disposed at every predetermined angle around an axis line that extends in the front-rear direction and formed in a projection and recess manner in a direction of the axis line, the first member including a second fixation member that is disposed at a side of the first fixation member facing the second member and that includes an open portion configured to open a pass to the first cam teeth and a locking portion configured to close the path to the first cam teeth, each of the open portion and the locking portion being disposed at the every predetermined angle around the axis line, and the second member is connected to be rotatable about the axis line and includes a second cam tooth, the second cam tooth passing through the open portion to be pressed by one of the first cam teeth in a case where the first sliding member moves further in the front direction in the tilt-up state of the movable panel and being pressed by the locking portion in a case where the first sliding member thereafter moves in the rear direction so that the second cam tooth rotates by the predetermined angle to engage with the locking portion.

7. The sunroof apparatus according to claim 1, wherein the check mechanism maintains the movable panel in the tilt-up state while releasing the restriction of the movement of the movable panel in the front-rear direction until the movable panel returns to an initial restored state in a case where the first sliding member moves in the front direction in an open state of the movable panel, the initial restored state corresponding to a state in which the movable panel is shifted to the tilt-up state from the fully closed state, the sunroof apparatus further including a restriction portion restricting the second cam tooth from being pressed by one of the first cam teeth until the movable panel returns to the initial restored state in a case where the first sliding member moves in the front direction in the open state of the movable panel, wherein the second cam tooth is pressed by one of the first cam teeth in a case where the first sliding member moves further in the front direction in the initial restored state of the movable panel and is guided to the open portion in a case where the first sliding member thereafter moves in the rear direction so that the second cam tooth rotates by the predetermined angle to pass through the open portion.

8. The sunroof apparatus according to claim 2, wherein the check mechanism maintains the movable panel in the tilt-up state while releasing the restriction of the movement of the movable panel in the front-rear direction until the movable panel returns to an initial restored state in a case where the first sliding member moves in the front direction in an open state of the movable panel, the initial restored state corresponding to a state in which the movable panel is shifted to the tilt-up state from the fully closed state, the sunroof apparatus further including a restriction portion restricting the second cam tooth from being pressed by one of the first cam teeth until the movable panel returns to the initial restored state in a case where the first sliding member moves in the front direction in the open state of the movable panel, wherein the second cam tooth is pressed by one of the first cam teeth in a case where the first sliding member moves further in the front direction in the initial restored state of the movable panel and is guided to the open portion in a case where the first sliding member thereafter moves in the rear direction so that the second cam tooth rotates by the predetermined angle to pass through the open portion.

9. The sunroof apparatus according to claim 3, wherein the check mechanism maintains the movable panel in the tilt-up state while releasing the restriction of the movement of the movable panel in the front-rear direction until the movable panel returns to an initial restored state in a case where the first sliding member moves in the front direction in an open state of the movable panel, the initial restored state corresponding to a state in which the movable panel is shifted to the tilt-up state from the fully closed state, the sunroof apparatus further including a restriction portion restricting the second cam tooth from being pressed by one of the first cam teeth until the movable panel returns to the initial restored state in a case where the first sliding member moves in the front direction in the open state of the movable panel, wherein the second cam tooth is pressed by one of the first cam teeth in a case where the first sliding member moves further in the front direction in the initial restored state of the movable panel and is guided to the open portion in a case where the first sliding member thereafter moves in the rear direction so that the second cam tooth rotates by the predetermined angle to pass through the open portion.

10. The sunroof apparatus according to claim 4, wherein the check mechanism maintains the movable panel in the tilt-up state while releasing the restriction of the movement of the movable panel in the front-rear direction until the movable panel returns to an initial restored state in a case where the first sliding member moves in the front direction in an open state of the movable panel, the initial restored state corresponding to a state in which the movable panel is shifted to the tilt-up state from the fully closed state, the sunroof apparatus further including a restriction portion restricting the second cam tooth from being pressed by one of the first cam teeth until the movable panel returns to the initial restored state in a case where the first sliding member moves in the front direction in the open state of the movable panel, wherein the second cam tooth is pressed by one of the first cam teeth in a case where the first sliding member moves further in the front direction in the initial restored state of the movable panel and is guided to the open portion in a case where the first sliding member thereafter moves in the rear direction so that the second cam tooth rotates by the predetermined angle to pass through the open portion.

* * * * *